United States Patent [19]
Klueger

[11] Patent Number: 6,082,803
[45] Date of Patent: Jul. 4, 2000

[54] SPARE TIRE COVER RETAINER

[75] Inventor: Herbert D. Klueger, Farmington Hills, Mich.

[73] Assignee: DaimlerChrysler Corporation, Auburn Hills, Mich.

[21] Appl. No.: 09/238,718

[22] Filed: Jan. 28, 1999

[51] Int. Cl.[7] ...................................................... B60N 3/12
[52] U.S. Cl. ...................... 296/37.2; 296/37.3; 224/42.24
[58] Field of Search ................................. 296/37.2, 37.3; 224/42.9, 42.24

[56] References Cited

U.S. PATENT DOCUMENTS

| | | |
|---|---|---|
| 1,311,267 | 7/1919 | Draver . |
| 1,593,920 | 7/1926 | Sutherland . |
| 1,616,155 | 2/1927 | Uebelmesser . |
| 1,813,094 | 7/1931 | Appel . |
| 1,929,679 | 9/1933 | Duncan ................................. 296/37.3 |
| 2,556,570 | 6/1951 | Binsfield ............................... 224/42.08 |
| 2,631,764 | 3/1953 | Brown ................................... 224/42.23 |
| 2,631,886 | 3/1953 | Keller ..................................... 296/37.2 |
| 2,839,232 | 6/1958 | Homeier ............................... 224/42.12 |
| 3,210,117 | 10/1965 | Hall ......................................... 296/37.2 |
| 3,330,431 | 7/1967 | Knecht ..................................... 214/454 |
| 3,880,335 | 4/1975 | Winkler ................................. 224/42.13 |
| 3,987,947 | 10/1976 | Della Pella .......................... 224/42.06 |
| 4,076,158 | 2/1978 | Barr ....................................... 224/42.25 |
| 4,225,066 | 9/1980 | Barr ....................................... 224/42.24 |
| 4,398,765 | 8/1983 | Ishikawa ................................. 296/37.2 |
| 4,410,117 | 10/1983 | Crawford et al. .................... 224/42.06 |
| 4,423,900 | 1/1984 | Sugimoto et al. ................... 296/37.14 |
| 4,676,415 | 6/1987 | Kennedy ............................... 224/42.06 |
| 4,687,124 | 8/1987 | Mahr ..................................... 224/42.24 |
| 4,738,382 | 4/1988 | Natori ................................... 224/42.24 |
| 5,080,269 | 1/1992 | Larsson et al. ....................... 224/42.24 |
| 5,118,017 | 6/1992 | Buck ..................................... 224/42.13 |
| 5,513,788 | 5/1996 | Cochrane et al. ................... 224/42.23 |
| 5,586,698 | 12/1996 | Satoh ................................... 224/42.24 |
| 5,669,534 | 9/1997 | Edgerley ............................... 224/42.23 |
| 5,799,845 | 9/1998 | Matsushita ............................ 296/37.2 |

FOREIGN PATENT DOCUMENTS

| | | | |
|---|---|---|---|
| 000578547 | 1/1994 | European Pat. Off. .............. | 296/37.2 |
| 002687629 | 8/1993 | France .................................. | 296/37.2 |
| 348447 | 7/1934 | Germany .............................. | 296/37.2 |
| 405178240 | 7/1993 | Japan .................................... | 296/37.2 |

*Primary Examiner*—Joseph D. Pape
*Assistant Examiner*—Kiran Patel
*Attorney, Agent, or Firm*—Lawrence J. Shurupoff

[57] ABSTRACT

A tire is held with a threaded rod or bolt in a compartment such as a recessed well formed in the trunk of a vehicle. A wing nut threaded to the rod clamps the tire to the floor of the compartment. A planar cover of sheet of thin material fits partially over and covers the tire and the compartment. A cap threaded to the end of the bolt fits through an aperture formed in the cover. The periphery of the aperture formed in the cover is held between a pair of flanges formed on the cap to provide vertical support to the cover in both upward and downward directions.

9 Claims, 2 Drawing Sheets

SPARE TIRE COVER RETAINER

BACKGROUND OF THE INVENTION

1. Field of the Invention

The present invention relates generally to a retainer for a spare tire cover and more particularly to such a retainer which supports and secures a spare tire cover in both upward and downward directions.

2. Description of Prior Developments

Spare tire covers require spacers of various lengths, depending on the size of the spare tire, to provide vertical support to the central portion of the cover overlying a spare tire, typically located in the trunk of a vehicle. Conventional spare tire covers include a retainer which is applied to the top of the cover after the cover is installed over a tire. Such retainers can only apply downward pressure on the cover thereby necessitating the use of spacers between the tire hub and cover to provide vertical support beneath the cover.

Accordingly, a need exists for a retainer which may be secured to a carriage bolt or similar threaded rod which secures a spare tire within a spare tire compartment.

A further need exists for such a retainer which may be secured to a carriage bolt or similar threaded member prior to the installation of the spare tire cover.

A further need exists for such a spare tire cover retainer which may be quickly and easily snugged down and tightened by hand rotation.

A further need exists for a retainer for a spare tire cover which covers the exposed end of a spare tire hold down bolt which, if not covered, can damage items placed in the vehicle trunk.

Yet a further need exists for the elimination of multiple spacers currently in use to support a spare tire cover due to the different sized tires placed in a spare tire compartment.

SUMMARY OF THE INVENTION

The present invention has been developed to meet the needs noted above and therefore has as an object the provision of a retainer for a spare tire cover which completely covers the exposed end of a spare tire hold down bolt so as to prevent damage to items placed in the trunk by the sharp exposed end of the bolt.

A further object of the invention is the elimination of the use of multiple spacers which heretofore were required for placement between the spare tire cover and tire for providing vertical support to the spare tire cover.

A further object of the invention is the provision of a retainer for a spare tire cover that may be threaded to the spare tire hold down bolt prior to the installation of the spare tire cover over the spare tire.

These and other objects are met by the present invention which is directed a retainer for a spare tire cover. The retainer is adapted to be threaded directly to the end of a carriage bolt used to secure a spare tire within a spare tire well such as the type provided in a recessed well formed in the trunk of a vehicle.

Contrary to conventional practice, a separate hold down bolt such as a wing nut or the like is used to secure the spare tire within its well. A carriage bolt is adapted to extend upwardly from the butterfly nut such that its free end projects upwardly from the hub of the spare tire up to a level just below or equal to the level of a later installed tire cover. A retainer cover, in the form of a flanged cap includes a central threaded portion for receiving the upstanding free end of the carriage bolt. The retainer may be threaded to the bolt prior to the installation of the spare tire cover over the spare tire. One or more wings or projections are formed around the periphery of the retainer cap and corresponding cut-outs are formed in an aperture formed through the spare tire cover.

The spare tire cover may simply be lowered over the retainer cap and once the retainer cap partially extends through the aperture, it may be rotated by hand to lock the spare tire cover in position.

An annular flange located along the lower surface of the retainer serves as a seat for vertically upwardly supporting the spare tire cover. The wings or projections formed on the upper portion of the cap hold the spare tire cover in place and secure it against upward movement. This arrangement eliminates squeaks and rattles and securely holds the spare tire cover in place.

BRIEF DESCRIPTION OF THE DRAWINGS

In the drawings.

In the drawings, like reference numerals denote like or similar parts.

DETAILED DESCRIPTION OF THE PREFERRED EMBODIMENTS

Figure 2:
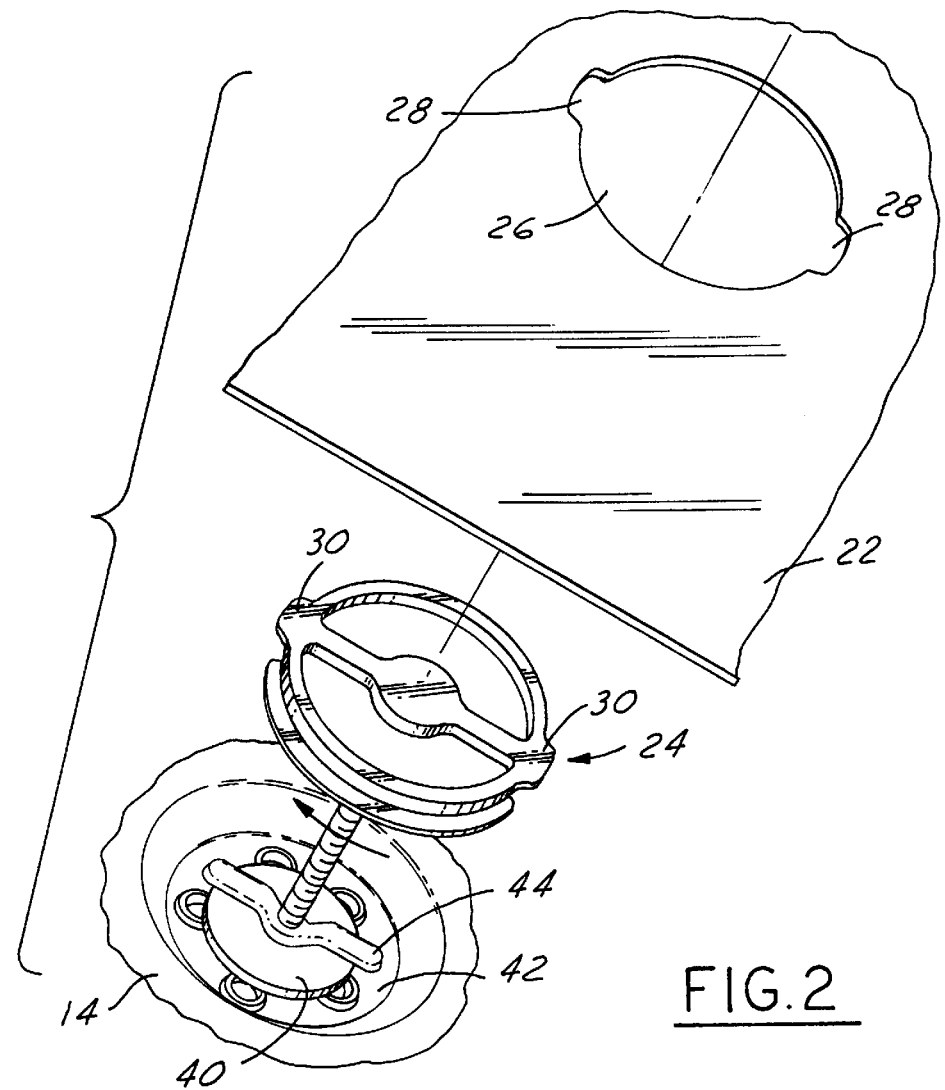
FIG. 2 is an exploded partial view of the spare tire retainer cover, wheel hub and spare tire cover of FIG. 1.

The present invention will now be described in conjunction with the drawings, beginning with FIG. 1 which shows an automotive tire 10 mounted on a wheel 12 having a wheel hub 14 held within a recessed well 16 located beneath the floor 18 of a vehicle storage compartment or the like. In this particular example, well 16 may be in the form of a circular tub located within the trunk 20 of an automobile. A square, circular or other shaped spare tire cover 22 formed of a somewhat flexible fiberboard or other panel material is held in position over the well 16 with a spare tire cover retainer 24 constructed in accordance with the invention.

As seen in FIG. 2, the spare tire cover 22, which acts as a lid over the recessed well 16, has an aperture 26 formed therethrough for allowing the retainer to partially pass through the aperture and cover. Aperture 26 further includes a pair of diametrically-opposed radially-outwardly projecting clearance slots 28 dimensioned to allow a corresponding pair of diametrically opposed ears 30 formed on the retainer 24 to pass therethrough.

Figure 1:
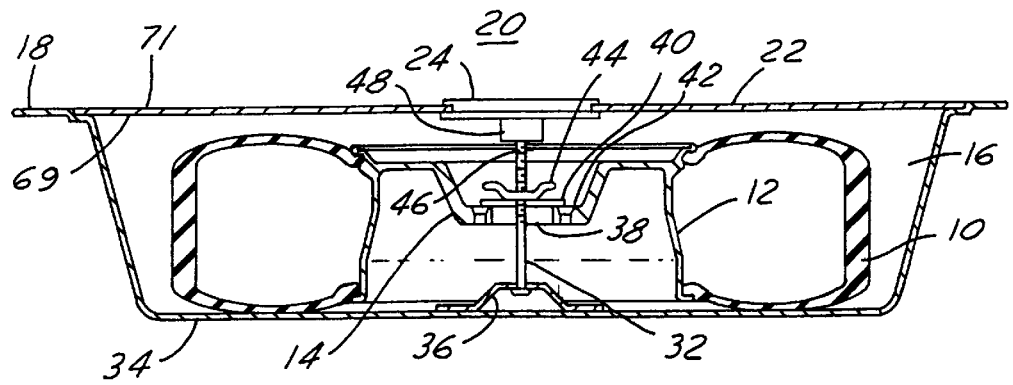
FIG. 1 is a cross-sectional view taken through the center of a spare tire mounted within a spare tire well and covered with a spare tire cover which is retained by a retainer constructed in accordance with the invention.

As further seen in FIG. 1, an upstanding threaded bolt 32 is anchored to the floor 34 of well 16 by bracket 36 which is welded or otherwise fastened to the floor 34. Bolt 32 extends upwardly through a standard opening 38 in wheel hub 14.

A washer 40 inserted over bolt 32 is clamped to the upper inner surface 42 of wheel hub 14 with a threaded fastener such as wing nut 44 which is torqued down over the washer.

In this manner, the tire 10 is securely fastened and clamped against floor 34 within the recessed well 16.

Figure 4:
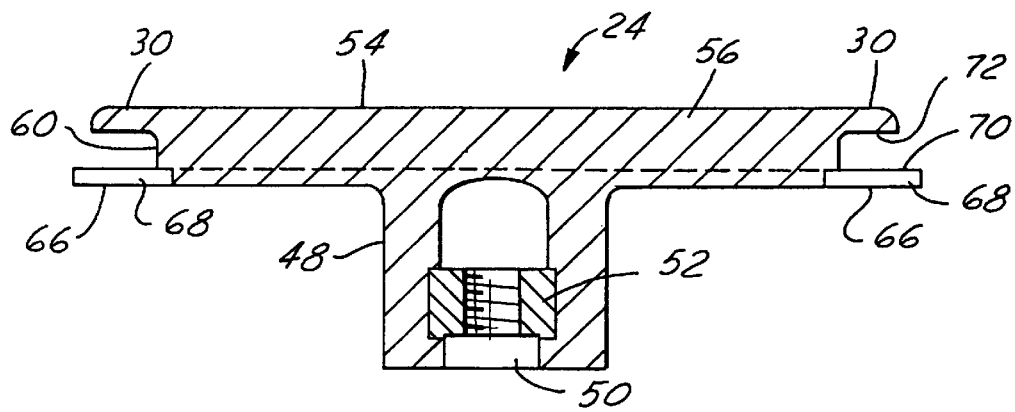
FIG. 4 is a view in section of the spare tire cover retainer of FIG. 3 taken through line 4—4 thereof and showing an molded threaded nut insert molded within the system of the retainer.

At this point, the spare tire retainer 24 may be threaded onto the free end 46 of bolt 32. As seen in FIG. 4, retainer 24 is formed with a hollow stem 48. A recess or bore 50 formed centrally through stem 48 may include a threaded portion such as in the form of an insert-molded threaded nut 52.

Figure 3:
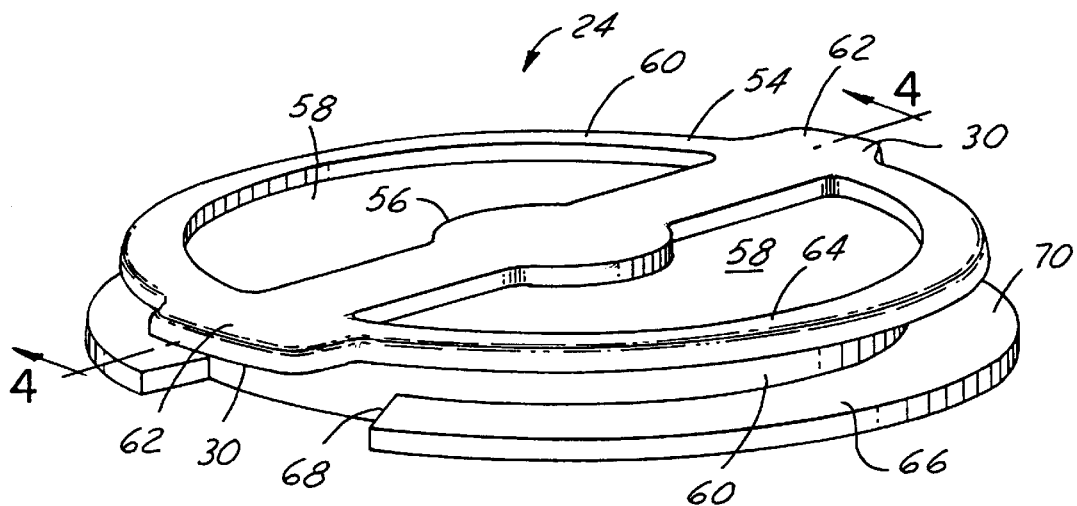
FIG. 3 is a perspective view of the spare tire cover retainer of FIGS. 1 and 2.

As seen in FIGS. 3 and 4, the retainer 24 is formed with a generally circular cap or head portion 54. A diametrically-extending rib 56 projects upwardly from the top of the retainer cap to form a finger grip for twisting and turning the cap. A pair of D-shaped recesses 58 is formed on opposite sides of rib 56. An annular cylindrical (or slightly frustoconical) wall 60 surrounds both the D-shaped recesses 58 and the rib 56. Ears 30 project radially outwardly from the opposite ends of rib 56 and have their top surfaces generally co-planar with the top surface 64 of wall 60.

A radially-extending annular ridge or support flange 66 surrounds the bottom edge of wall 60. Notches or cutouts 68 may be formed in support flange 66 directly below each ear 30. The outer diameter of wall 60 is dimensioned to fit closely within circular aperture 26 while the outer diameter of the annular support flange 66 is dimensioned larger than the diameter of aperture 26.

Once a tire 10 is secured within the recessed well 16 as noted above, that is, by being clamped to floor 34 by pressure applied by wing nut 44 and washer 40, the spare tire cover retainer 24 is threaded onto the free end 46 of bolt 32. The spare tire cover 22 is then placed over the recessed well 16. The clearance slots 28 in the cover 22 are aligned with the ears 30 on the retainer 24 by turning the retainer 24 around the threaded bolt until appropriate alignment is achieved.

At this point, the cover 22 passes freely over and around ears 30 and wall 60 of the retainer 24 and seats upon the upper surface 70 of support flange 66. The retainer 24 may then be moved upwardly or downwardly by appropriate rotation on the bolt 32 until the cover 22 is aligned substantially co-planar with the retainer 24 and floor 18, and substantially parallel with the floor 34 of well 16.

It can be appreciated that this particular assembly allows for the support and retention of the cover 22 in both upward and downward vertical directions. That is, the bottom surface 69 (FIG. 1) of cover 22 is firmly seated around the upper surface 70 of the support flange 66 and is thereby supported vertically upwardly against downward movement. The upper surface 71 of the cover 22 is securely retained from upward movement by abutment against the lower surface 72 of each of the ears 30. Of course, for such support to be provided by ears 30, the retainer must be twisted to a position where the ears 30 are out of alignment with clearance slots 28 and in engagement with the upper surface 71 of the retainer 22.

It should be understood that while this invention has been discussed in connection with one particular example, those skilled in the art will appreciate that other modifications can be made without departing from the spirit of this invention after studying the specification, drawings, and the following claims.

What is claimed is:

1. A tire retainer assembly, comprising:
    a tire container having a floor;
    a threaded member connected to said floor;
    a tire disposed in said tire container;
    a threaded nut threaded on said threaded member for clamping said tire to said floor;
    a tire cover disposed over said tire container, said tire cover having an upper surface, a lower surface and an opening formed therethrough; and
    a tire cover retainer threaded on said threaded member, said retainer comprising a wall extending through said aperture, a first support for supporting said lower surface of said tire cover and a second support for supporting said upper surface of said tire cover.

2. The assembly of claim 1, wherein said first support comprises a flange projecting outwardly from said wall.

3. The assembly of claim 1, wherein said second support comprises an ear projecting outwardly from said wall.

4. The assembly of claim 1, wherein said threaded member comprises a threaded bolt.

5. The assembly of claim 1, wherein said opening in said tire cover has a pair of clearance cut outs and said second support comprises a pair of ears insertable through said cut outs.

6. The assembly of claim 1, wherein said cover further comprises a grip for threading said tire cover on said threaded member.

7. The assembly of claim 1, wherein said tire container comprises a recessed well in an automotive vehicle.

8. The assembly of claim 1, wherein said retainer comprises a circular cap having a central threaded stem threaded on said threaded member.

9. The assembly of claim 8, wherein said threaded stem comprises a threaded nut.

\* \* \* \* \*